Patented Mar. 28, 1950

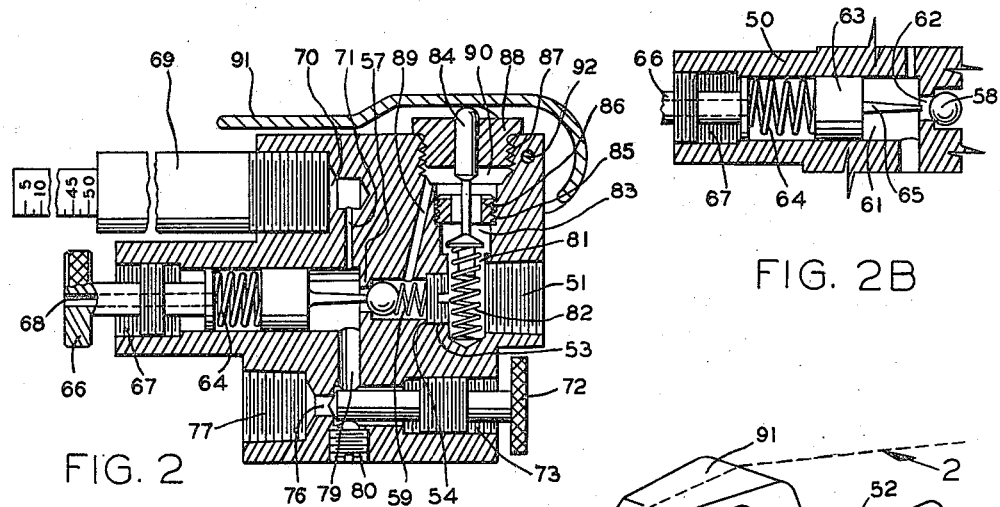
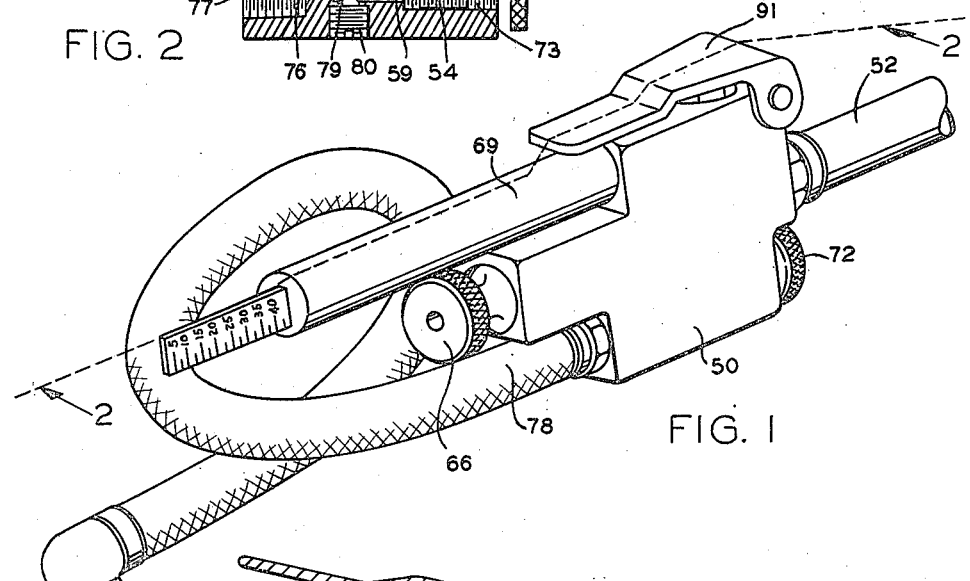
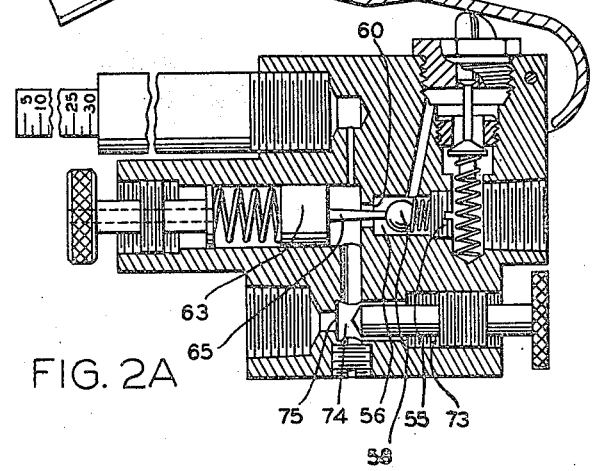

2,501,801

UNITED STATES PATENT OFFICE 2,501,801

COMBINED TIRE INFLATING PRESSURE REGULATOR, PRESSURE GAUGE, AND VALVE DEVICE

Hjalmar S. Wallin, Los Angeles, Calif.

Application February 9, 1948, Serial No. 7,036

2 Claims. (Cl. 137—69.5)

My invention relates to improvements in combined pressure regulator, pressure gauge and valve devices used in the dispensing of compressed air from pumps or tanks to automobile tires and the like.

One object of my invention is to provide a device that will include an automatic pressure supply shut off valve that operates according to a preselected pressure setting thereby reducing to one the number of valve opening and gauge reading operations usually necessary to obtain the desired pressure in a tire.

Another object is to provide an improvement in structures of this class whereby a conventional pressure gauge is employed for both the purpose of ascertaining tire pressures and for indicating whatever preselected pressure the device may have been set to operate.

Another object is to provide a device that may be held in the hands in the best light available while being set to the predetermined pressure desired so that no light need be available while the tire is being inflated as the automatic shut off feature operates without the need of operator's visual attention.

Another object is to provide an improvement in devices of this type whereby the rise of pressure indicated on the gauge is coincident with the rise of pressure within the tire being inflated, thereby affording an additional safeguard against bursting of tires due to inadvertent over inflation.

A further object is to provide an improvement in a device of this class whereby the separate and individual purpose of ascertaining the air pressure within a tire may be accomplished.

Another object is to provide an improvement in a device of this character whereby the device may be used to release air or fluid under pressure into the atmosphere for cleaning, dusting and other purposes.

Another object is to provide all of these features in an arrangement of simplicity, compactness and sturdy construction.

My invention resides in the novel combination of principles and in the particular arrangement of parts hereinafter described, claimed and illustrated in the accompanying drawing, in which:

Fig. 1 is a perspective view of a combined pressure regulator, pressure gauge and valve of improved design as herein described, shown connected to the conventional pressure supply line and to the usual outlet tube of the valveless type;

Fig. 2 is a section taken approximately on line 2—2 of Fig. 1 showing intake valve operating handle depressed admitting air pressure, outlet port valve closed retaining pressure within the device, and pressure regulator screw adjusted to a predetermined setting;

Fig. 2a is a section taken also approximately on line 2—2 of Fig. 1 showing intake valve operating handle released allowing intake valve to close and showing outlet valve in open position permitting air under pressure from a tire to flow into the device.

Fig. 2b is a broken section taken also approximately on line 2—2 of Fig. 1 showing pressure regulator screw at the beginning of its travel in which position the pressure regulation portion of the device is not in use.

Similar numerals refer to similar parts throughout the several views.

Referring to the drawing by numerals of reference, 50 designates a valve body constructed preferably of metal having several bores one of which being laterally and approximately centrally located and consisting of a number of coaxial portions has at the rearward or pressure supply end an inlet port 51 suitably threaded to engage the nipple of the conventional supply hose 52. Adjacent to inlet port 51 and extending as far as annular shoulder 54 threaded portion 53 is formed to receive threaded plug 55 which has a screwdriver slot or other torque tool recess and which is tightly fitted against annular shoulder 54 for the purpose of sealing interior of body against admission of pressure fluid at this point from inlet port 51. Adjacent to annular shoulder 54 check valve chamber 56 extends to partition 57 having a diameter suitable to accommodate valve spring 59 and to permit air flow past check valve ball 58 and to position said ball properly in respect to valve seat 60.

Fluid passage 62 affords communication between check valve chamber 56 and piston chamber 61. Within piston chamber 61 piston 63 is slidably yet closely fitted to operate back and forth under force from coil spring 64 against plain end and force of fluid pressure against stem end. Piston stem 65 formed as an integral part of piston 63 serves to unseat check valve ball 58 when hand screw 66 is adjusted rearward against coil spring 64 by means of threaded engagement of hand screw 66 with threaded bore portion 67 situated adjacent to piston chamber 61. Axially drilled hole 68 through hand screw 66 serves to vent that portion of piston chamber 61 occupied by coil spring 64 in case of leakage of air past piston 63.

Located in parallel position above central bore just described fluid pressure gauge 69 of the conventional type is fitted into body 50 by means of threaded port 70 which communicates with piston chamber 61 by means of transverse connecting passage 71.

Located in parallel position below central bore shut off valve screw 72 is suitably fitted into threaded portion 73 of lower bore 74. Shut off valve screw 72 has a conical end to engage valve seat 75 which is the rearward end of connecting passage 76 that communicates directly with outlet port 77 which is suitably formed to receive the conventional flexible outlet tube 78 of the valveless type.

Lower bore 74 communicates with piston chamber 61 by means of transverse connecting passage 79. Threaded screw plug 80 is tightly fitted into body 50 to act as a seal as this hole is used only as an opening through which cross bores 71 and 79 are coaxially drilled in manufacture.

Cross bore 81 intersects threaded portion 53 with its axial centerline at right angles but in the same plane with centerline of threaded portion 53. Cross bore 81 serves to house intake valve spring 82 and to act as a communicating passage between inlet port 51 and intake valve chamber 83. Intake valve chamber 83 is coaxial with cross bore 81 and has a concentric diameter therewith which is slightly larger to accommodate beveled flange of intake valve 84. Chamber 83 extends to shoulder of threaded portion 85 which is formed to secure in fixed position valve seat screw plug 86. Threaded portion 85 extends to bottom shoulder of threaded portion 87 which is suitably formed to accommodate valve guide nut 88. Valve guide nut 88 is threaded to the inside face of hexagonally shaped flange which latter serves as a wrenching means for securing the nut tightly against body 50.

Bore 89 is so formed in the body 50 as to serve as a connecting passage between check valve chamber 56 and chamber 90 existing between inner face of valve guide nut 88 and bottom shoulder of threaded portion 87. Chamber 90 communicates with chamber 83 through orifice of valve seat plug 86.

Intake valve handle 91 is mounted pivotally on upper portion of valve body 50 by means of hinge pin 92 and is so arranged as to open intake valve 84 when depressed and allow same to close when released.

In the drawing the centerlines of all fluid passages, bores and chambers are shown to lie in a single plane.

Operation

Intake valve handle 91 being depressed forces beveled face of intake valve 84 to move away from valve seat of screw plug 86 permitting fluid pressure from supply hose 52 to enter check valve chamber 56 via intake port 51; cross bore 81; intake valve chamber 83; orifice of valve seat screw plug 86; chamber 90 and bore 89. Fluid under pressure entering check valve chamber 56 is restrained in the rearward direction by screw plug 55 and flows past check valve ball 58; through passage 62 and into piston chamber 61 when hand screw 66 is adjusted so that piston stem 65 will unseat check valve ball 58. Fluid then partially disperses through connecting passage 71 into pressure gauge 69 and partially through connecting passage 79 into lower bore 74. When shut off valve screw 72 is screwed inwardly against valve seat 75 fluid pressure is restrained within the valve body 50 causing pressure to build up simultaneously within piston chamber 61 and gauge 69. Slidably fitted piston 63 will then be forced by fluid pressure against coil spring 64 causing it to deflect until check valve ball 58 is seated, at which time gauge 69 will indicate a pressure in accordance with adjustment of hand screw 66. Thus it is possible to adjust hand screw 66 to the pressure at which it is desired fluid supply will be shut off by check valve ball 58. After making such desired adjustment and moving valve screw 72 away from valve seat 75 and applying outlet tube 78 to a pneumatic tire with intake valve handle 91 depressed, fluid pressure will pass through the valve body 50 and will rise therein coincidentally with the rise of pressure in the tire and fluid supply will be automatically shut off at the desired pressure with gauge 69 indicating that pressure until tube 78 is disconnected from tire valve stem.

In using the device herein described for the separate and specific purpose of ascertaining fluid pressure in a tire, outlet tube 78 is applied to the valve stem of the tire being checked, intake valve handle 91 is released, valve screw 72 is moved away from seat 75 allowing fluid pressure from the tire to enter valve body 50 where it will be restrained from escaping past valve seat of screw plug 86 by the combined force of supply pressure from hose 52 and force of spring 82 against valve 87. Pressure will be restrained also by piston 63, the adjusted position of which is immaterial because check valve ball 58 can neither assist nor interfere with this operation. Fluid pressure existing within a tire being tested is caused thusly to act upon gauge 69 which indicates on the graduated scale thereof the pressure within said tire.

In using the device to discharge compressed air into the atmosphere for cleaning, dusting and other purposes the same method of operating the device as that used for inflating tires to a predetermined pressure is used except that the flexible hose is not connected to a tire valve stem but employed as a free flowing nozzle as it is intended there be no form of valve within said flexible hose or nozzle and nipple attached thereto.

Summarizing briefly those advantages and differences for which a patent is solicited, attention is directed to:

First, the novel manner in which the pressure gauge is employed as a part of the preselecting pressure regulation portion of the device yet allowed to function independently for testing tire pressures. Thus a pressure gauge is the only unit of a calibrated nature required; coil spring 64 being a pressure responsive element of an approximate rather than an exactly coordinated yield strength.

Second, the novel idea of providing a hand controlled outlet valve 72 to enable pressure control setting to be made without connection of flexible valveless outlet tube to tire valve stem if so desired. Thusly, the disadvantage of a check valve within the flexible outlet tube which prevents the free flowing use of air for dusting purposes etc. is avoided yet the advantage of an outlet valve for presetting purposes is provided.

Third, the novel arrangement which permits the use of the device in a manner to allow the pressure in a tire to back up into pressure gauge without encountering interference of pressure from supply source.

Fourth, the novel manner in which the gauge is employed to act at all times as a visual safeguard against blowouts due to over inflating, inasmuch as pressure gauge cannot be by-passed by air pressure being dispensed into a tire.

Fifth, the unique arrangement and design which provides these desirable improvements without discarding or impairing any of the advantages to be found in the usual conventional type now in use.

In accordance with the usual practice the drawing shows only the fundamental arrangement and construction of the invention, such obvious refinements as gaskets, leather cups, snap rings, etc., being omitted as unessential to the description and specification of the invention. By this it is understood that the addition or omission of such features as do not alter the working principle of the device in no way add to or detract from the invention itself.

This invention may be used separately; as a valve to discharge compressed air into the atmosphere; as a valve to inflate tires; as a device to gauge the pressures within tires and also as a combination pressure regulator, pressure gauge and valve to dispense predetermined amounts of compressed air into tires.

I claim as my invention:

1. In a device of the class described, the particular combination of a valve body preferably made of metal, a pressure fluid supply intake port, a bore connecting said intake port with a valve chamber, a hand operable intake valve controlling communication of said chamber with a bore leading to and connecting with a regulator valve chamber in which a regulator valve ball is housed together with a coil spring arranged to cooperate with the force of supply pressure to urge said regulator valve ball against a seat in said regulator valve chamber, a bore adjacent to said seat connecting said regulator valve chamber with a piston chamber housing a slidably fitted piston, a stem extension integrally formed on said piston to effect relative movement between said check valve ball and said seat, a compressible coil spring also housed within said piston chamber adjacent to the end of said piston opposite to said stem extension, a hand operable screw plug arranged to permit the desired adjustment of said compressible spring and said piston relative to said check valve ball, an axially drilled hole through said screw plug to vent to the atmosphere that portion of said piston chamber occupied by said compressible spring, a transverse bore of small diameter connecting said piston chamber with a port into which a conventional pressure gauge is mounted, a transverse bore connecting said piston chamber with another bore housing a hand operable outlet valve which controls communication of said piston chamber with an outlet port suitably formed to connect with a valveless flexible outlet tube of conventional design, all substantially as set forth.

2. In a combined tire inflating pressure regulator, pressure gauge and valve, the combination of a main body preferably made of metal, a fluid passage through said body consisting of an inlet port for connection of one end of said passage to a supply source of compressed air, a bore leading from said inlet port to an inlet valve chamber, a spring loaded valve within said inlet valve chamber and said bore normally seated on a valve seat therebetween, a hand operable lever to unseat said spring loaded valve, a bore communicating with said intake valve chamber and a regulator valve chamber, a spring loaded regulator valve within said regulator valve chamber normally disposed to check fluid flow at this point, an opening leading from said regulator valve chamber to a piston chamber, a slidably but substantially hermetically fitted piston therein, a coaxial and integrally formed stem on one end of said piston to unseat said regulator valve upon movement thereagainst, a coil spring of suitable elasticity loosely installed within a continuation of said piston chamber and disposed to move said piston against said regulator valve upon movement of itself caused by a hand adjustable screw plug threadedly engaged within a threaded portion of said continuation of said piston chamber, an axially formed hole through said screw plug to vent said continuation of said piston chamber, a bore connecting said piston chamber with a port in which a conventional pressure gauge is mounted, a bore connecting said piston chamber with an outlet valve chamber in which a hand operable outlet valve is fitted, an orifice connecting said outlet valve chamber with an outlet port for connection with a conventional flexible outlet tube of the valveless type, all substantially as set forth.

HJALMAR S. WALLIN.

REFERENCES CITED

The following references are of record in the file of this patent:

UNITED STATES PATENTS

| Number | Name | Date |
|---|---|---|
| 1,268,467 | Jacobson | June 4, 1918 |
| 1,458,923 | Fancher | June 19, 1923 |
| 1,578,955 | Chittenden | Mar. 30, 1926 |
| 1,699,378 | Smith | Jan. 15, 1929 |
| 2,067,882 | Alessi | Jan. 19, 1937 |
| 2,237,940 | Koenig | Apr. 8, 1941 |

FOREIGN PATENTS

| Number | Country | Date |
|---|---|---|
| 290,797 | Italy | Nov. 28, 1931 |